May 7, 1929. G. CHAMALES 1,712,330
PEANUT HEATER
Filed July 13, 1928
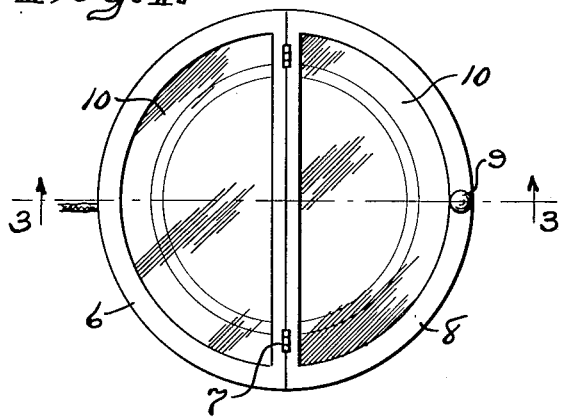
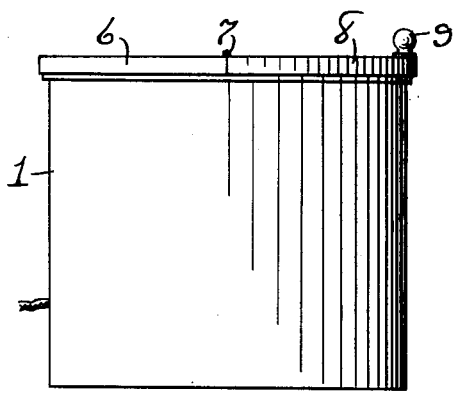
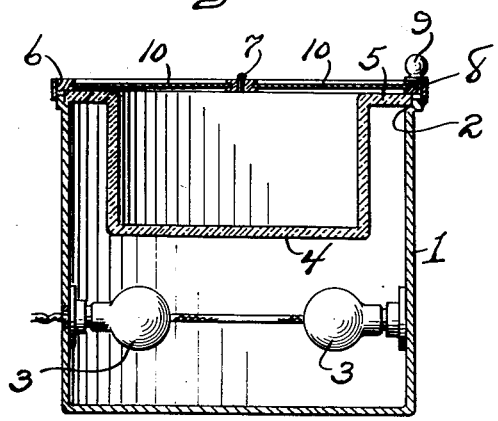
Gus Chamales
INVENTOR
BY Victor J. Evans
ATTORNEY Patented May 7, 1929.

1,712,330

UNITED STATES PATENT OFFICE.

GUS CHAMALES, OF ENID, OKLAHOMA.

PEANUT HEATER.

Application filed July 13, 1928. Serial No. 292,480.

This invention relates to a device for heating peanuts and the like, the general object of the invention being to provide a container having an open top with heating means therein, with a receptacle for holding the articles to be heated, said receptacle having a flange seated in a groove formed in the top of the container so that the receptacle is arranged in the container with its side walls spaced therefrom so that heated air can circulate around the bottom and side walls of the receptacle, thus thoroughly heating the articles in the receptacle.

Another object of the invention is to provide a cover for the container which also covers the receptacle and which is provided with a hinged door so that access can be had to the receptacle.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:—

Figure 1 is a plan view of the device.

Figure 2 is an elevation thereof.

Figure 3 is a section on line 3—3 of Figure 1.

In these views, the numeral 1 indicates the container which has its top open with its upper edge pressed outwardly to form an interior groove 2. Electric lamps 3 are placed in the container to heat the interior thereof, but if desired, the container may be heated by other means.

A receptacle 4, preferably formed of Pyrex, is provided with an exterior flange 5 at its top, the edge of the flange engaging the groove 2 so that the receptacle is supported from the top of the container with the body of the receptacle spaced from the walls of the container, thus enabling the heated air in the container to reach the side walls as well as the bottom of the receptacle.

A cover 6 fits over the top of the container and covers the receptacle and one-half of the cover is hingedly connected with the other half, as shown at 7, so that one-half of the cover forms a door 8 which may be lifted to provide access to the receptacle, a handle 9 being fastened to the door.

From the foregoing it will be seen that I have provided a simple device whereby peanuts and the like can be heated, and the device also acts as means for displaying the articles, as the articles can be seen through the transparent portions 10 forming part of the cover and its door.

It is thought from the foregoing description that the advantages and novel features of my invention will be readily apparent.

It is to be understood that changes may be made in the construction and in the combination and arrangement of the several parts, provided that such changes fall within the scope of the appended claims.

What I claim is:—

1. A device of the class described comprising a container having an open top, means for heating the interior of the container, a receptacle having an exterior flange at its top, means at the top of the container for supporting the flange with the body of the receptacle spaced from the walls of the container, a cover for the container which also acts to cover the receptacle, said cover having a door forming part and portions of the cover being formed of transparent material.

2. A device of the class described comprising a container having an open top with its upper edge pressed outwardly to form an interior groove, a receptacle formed of Pyrex and having an exterior flange, the edge of which engages the groove whereby the body of the receptacle depends into the container with its walls spaced from the container, a cover for the container enclosing the receptacle, a door part hinged to the cover, transparent members forming part of the cover and its door and a lamp within the container for heating the air therein.

In testimony whereof I affix my signature.

GUS CHAMALES.